US011996110B2

(12) United States Patent
Fuchs et al.

(10) Patent No.: US 11,996,110 B2
(45) **Date of Patent: *May 28, 2024**

(54) APPARATUS AND METHOD FOR SYNTHESIZING AN AUDIO SIGNAL, DECODER, ENCODER, SYSTEM AND COMPUTER PROGRAM

(71) Applicant: Fraunhofer-Gesellschaft zur Foerderung der angewandten Forschung e.V., Munich (DE)

(72) Inventors: Guillaume Fuchs, Bubenrath (DE); Tom Baeckstroem, Nuremberg (DE); Ralf Geiger, Erlangen (DE); Wolfgang Jaegers, Erlangen (DE); Emmanuel Ravelli, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 63 days.

This patent is subject to a terminal disclaimer.

(21) Appl. No.: 17/827,316

(22) Filed: May 27, 2022

(65) Prior Publication Data

US 2022/0293114 A1 Sep. 15, 2022

Related U.S. Application Data

(63) Continuation of application No. 16/549,878, filed on Aug. 23, 2019, now Pat. No. 11,373,664, which is a (Continued)

(51) Int. Cl.
*G10L 19/02* (2013.01)
*G10L 19/087* (2013.01)
(Continued)

(52) U.S. Cl.
CPC ............ *G10L 19/087* (2013.01); *G10L 19/02* (2013.01); *G10L 19/12* (2013.01); *G10L 19/26* (2013.01); *G10L 19/06* (2013.01)

(58) Field of Classification Search
CPC ..... G10L 19/12; G10L 19/26; G10L 21/0364; G10L 21/038; G10L 19/002;
(Continued)

(56) References Cited

U.S. PATENT DOCUMENTS 5,664,055 A 9/1997 Kroon
5,915,234 A 6/1999 Itoh
(Continued)

FOREIGN PATENT DOCUMENTS

CN 1468427 A 1/2004
CN 101199004 A 6/2008
(Continued)

OTHER PUBLICATIONS

"ITU-T20080630", Telecommunication Standardization (Category A).

(Continued)

*Primary Examiner* — Vijay B Chawan
(74) *Attorney, Agent, or Firm* — Perkins Coie LLP; Michael A. Glenn

(57) ABSTRACT

A method and an apparatus for synthesizing an audio signal are described. A spectral tilt is applied to the code of a codebook used for synthesizing a current frame of the audio signal. The spectral tilt is based on the spectral tilt of the current frame of the audio signal. Further, an audio decoder operating in accordance with the inventive approach is described.

25 Claims, 4 Drawing Sheets

Related U.S. Application Data continuation of application No. 14/811,386, filed on Jul. 28, 2015, now Pat. No. 10,431,232, which is a continuation of application No. PCT/EP2014/051592, filed on Jan. 28, 2014.

(60) Provisional application No. 61/758,098, filed on Jan. 29, 2013.

(51) Int. Cl.

| | |
|---|---|
| ***G10L 19/12*** | (2013.01) |
| ***G10L 19/26*** | (2013.01) |
| *G10L 19/06* | (2013.01) |

(58) Field of Classification Search

CPC ..... G10L 19/005; G10L 19/083; G10L 19/09; G10L 19/173; G10L 25/12; G10L 19/02; G10L 19/0208; G10L 19/022; G10L 19/028; G10L 19/07; G10L 19/087

See application file for complete search history.

(56) References Cited

U.S. PATENT DOCUMENTS

| | | | |
|---|---|---|---|
| 6,134,518 | A | 10/2000 | Cohen et al. |
| 6,240,386 | B1 | 5/2001 | Thyssen et al. |
| 6,385,573 | B1 | 5/2002 | Gao et al. |
| 6,678,651 | B2 | 1/2004 | Gao |
| 6,678,652 | B2 | 1/2004 | Fuchigami et al. |
| 6,996,523 | B1 | 2/2006 | Bhaskar et al. |
| 7,092,889 | B2 | 8/2006 | Fuchigami et al. |
| 7,881,482 | B2 | 2/2011 | Christoph |
| 8,260,611 | B2 | 9/2012 | Vos et al. |
| 9,373,342 | B2 | 6/2016 | Pilli et al. |
| 9,646,624 | B2 * | 5/2017 | Disch ...................... G10L 19/26 |
| 9,672,843 | B2 * | 6/2017 | Krishnaswamy ... G10L 21/0264 |
| 9,706,314 | B2 * | 7/2017 | Jenison ................ H04R 25/505 |
| 9,779,747 | B2 * | 10/2017 | Wang ...................... G10L 19/26 |
| 9,792,920 | B2 * | 10/2017 | Disch .................... G10L 19/012 |
| 9,812,143 | B2 * | 11/2017 | Liu ......................... G10L 19/12 |
| 10,043,525 | B2 * | 8/2018 | Kaniewska .............. B41K 3/56 |
| 10,121,484 | B2 * | 11/2018 | Liu ....................... G10L 19/005 |
| 10,269,365 | B2 * | 4/2019 | Fuchs ................... G10L 19/087 |
| 10,304,470 | B2 | 5/2019 | Fuchs et al. |
| 10,373,625 | B2 * | 8/2019 | Fuchs ..................... G10L 19/12 |
| 10,431,232 | B2 * | 10/2019 | Fuchs ................... G10L 19/087 |
| 10,607,619 | B2 | 3/2020 | Fuchs et al. |
| 10,909,997 | B2 | 2/2021 | Fuchs et al. |
| 11,373,664 | B2 * | 6/2022 | Fuchs ..................... G10L 19/26 |
| 2003/0004710 | A1 | 1/2003 | Gao |
| 2005/0108007 | A1 | 5/2005 | Bessette et al. |
| 2006/0089836 | A1 | 4/2006 | Boillot et al. |
| 2006/0277042 | A1 * | 12/2006 | Vos ..................... G10L 21/0208 704/223 |
| 2008/0027716 | A1 | 1/2008 | Rajendran et al. |
| 2009/0070106 | A1 * | 3/2009 | Gao ...................... G10L 21/045 704/E19.001 |
| 2009/0177869 | A1 | 7/2009 | Novichkov et al. |
| 2009/0265167 | A1 * | 10/2009 | Ehara .................... G10L 19/265 704/226 |
| 2011/0099018 | A1 | 4/2011 | Neuendorf et al. |
| 2011/0295598 | A1 | 12/2011 | Yang et al. |
| 2014/0236588 | A1 | 8/2014 | Subasingha et al. |
| 2015/0332696 | A1 | 11/2015 | Fuchs et al. |
| 2015/0348562 | A1 | 12/2015 | Krishnaswamy et al. |
| 2015/0371653 | A1 | 12/2015 | Balam et al. |
| 2016/0343382 | A1 * | 11/2016 | Liu ....................... G10L 19/167 |
| 2017/0301361 | A1 * | 10/2017 | Liu ....................... G10L 19/167 |
| 2019/0333529 | A1 | 10/2019 | Fuchs et al. |
| 2021/0098010 | A1 | 4/2021 | Fuchs et al. |
| 2022/0293114 | A1 * | 9/2022 | Fuchs ..................... G10L 19/12 |

FOREIGN PATENT DOCUMENTS

| | | | |
|---|---|---|---|
| CN | 101836253 | A | 9/2010 |
| JP | 2002523806 | A | 7/2002 |
| JP | 2002528983 | A | 9/2002 |
| JP | 2012042984 | A | 3/2012 |
| RU | 2439721 | C2 | 1/2012 |
| RU | 2469422 | C2 | 12/2012 |
| TW | 200705823 | A | 2/2007 |
| TW | I383595 | B | 1/2013 |
| WO | 0111655 | A1 | 2/2001 |
| WO | 0191112 | A1 | 11/2001 |
| WO | 03097258 | A1 | 11/2003 |
| WO | 2006116025 | A1 | 11/2006 |
| WO | 2011048094 | A1 | 4/2011 |
| WO | 2011127569 | A1 | 10/2011 |
| WO | 2011148230 | A1 | 12/2011 |

OTHER PUBLICATIONS

ETSI TS 126 090, “Mandatory Speech Codec Speech Processing Functions”, Universal Mobile Telecommunications System, 1999, pp. 1-62.

ITU-T, G.718, “Frame error robust narrow-band and wideband embedded variable bit-rate coding of speech and audio from 8-32 kbit/s”, Recommendation ITU-T G.718, 257 pages.

Valin, Jm, et al., “Defintion of the Opus Audio Codec”, IETF, pp. 1-326.

* cited by examiner

APPARATUS AND METHOD FOR SYNTHESIZING AN AUDIO SIGNAL, DECODER, ENCODER, SYSTEM AND COMPUTER PROGRAM

CROSS-REFERENCE TO RELATED APPLICATIONS

This application is a continuation of copending U.S. patent application Ser. No. 16/549,878, filed Aug. 23, 2019, which in turn is a continuation of copending U.S. patent application Ser. No. 14/811,386, filed on Jul. 28, 2015, which in turn is a continuation of copending International Application No. PCT/EP2014/051592, filed Jan. 28, 2014, which is incorporated herein by reference in its entirety, and additionally claims priority from U.S. Application No. 61/758,098, filed Jan. 29, 2013, which is also incorporated herein by reference in its entirety.

BACKGROUND OF THE INVENTION

The present invention relates to the field of audio coding, more specifically to the field of synthesizing an audio signal. Embodiments relate to speech coding, particularly to the speech coding technique called code excited linear predictive coding (CELP). Embodiments provide an approach for adaptive tilt compensation in shaping the codes of a CELP in an innovative or fixed codebook.

The CELP coding scheme is widely used in speech communications and is an efficient way of coding speech. CELP synthesizes an audio signal by conveying to a linear predictive filter (e.g., LPC synthesis filter 1/A(z)) the sum of two excitations. One excitation is coming from the decoded past, which is called the adaptive codebook, and the other contribution is coming from a fixed or innovative codebook which is populated by fixed codes. One problem with the CELP coding scheme is that at low bit-rates the innovative codebook is not populated enough for modeling efficiently the fine structure of speech so that the perceptual quality is degraded and the synthesized output signal sounds noisy.

For mitigating coding artifacts, different solutions were already proposed and are described in reference [1] and in reference [2]. In these references, the codes of the innovative codebook are adaptively and spectrally shaped by enhancing the spectral regions corresponding to the formants of the current frame of the audio signal. The formant positions and the shapes can be deduced directly from the LPC coefficients which are coefficients available at both the encoder and the decoder. The formant enhancement of the codes c(n) of the innovative codebook are done by a simple filtering operation:

$$c(n)*f_e(n).$$

In this filtering process $f_e(n)$ is the impulse response of the filter having the following transfer function:

$$F_e(z) = \frac{A(1/w1)}{A(1/w2)}$$

where w1 and w2 are two weighting constants emphasizing more or less the formantic structure of the transfer function $F_e(z)$. The resulting shaped codes of the innovative codebook inherit one characteristic of the speech signal and the synthesized signal sounds less noisy.

In the CELP coding scheme it is also usual to add a spectral tilt to the codes of the innovative code book, which is done by filtering the codes from the innovative codebook as follows:

$$F_t(z)=1-\beta z^{-1}.$$

The factor β is related to the voicing of the previous audio frame, and the voicing can be estimated from the energy contribution from the adaptive codebook. For example, if the previous frame is voiced, it is expected that the current frame will also be voiced and that the codes will have more energy in the low frequencies, i.e. the spectrum has a negative tilt.

SUMMARY

An embodiment may have an apparatus for synthesizing an audio signal, comprising: an input for receiving an encoded audio signal, a decoder for decoding the encoded audio signal, the decoder comprising an adaptive codebook and a fixed codebook, and the encoded audio signal being an encoded speech signal, a filter coupled to the fixed codebook and configured to apply a spectral tilt to a code of the fixed codebook for obtaining a filtered code of the fixed codebook, a summer coupled to the adaptive codebook and to the filter, the summer configured to combine a code from the adaptive codebook and the filtered code of the fixed codebook for obtaining a combined code, and a LPC synthesis filter coupled to the summer and configured to synthesize the audio signal, wherein the spectral tilt is based on the spectral tilt of the current frame of the audio signal, wherein the apparatus is configured to determine the spectral tilt of the current frame of the audio signal on the basis of spectral envelope information for the current frame of the audio signal, and wherein the filter is configured to apply the spectral tilt by filtering the code of the fixed codebook based on a transfer function modeling the spectral tilt.

Another embodiment may have an audio decoder comprising an apparatus for synthesizing an audio signal according to the invention.

Another embodiment may have a system, comprising: an audio decoder comprising apparatus for synthesizing an audio signal according to the invention, and an audio encoder for encoding an audio signal, wherein the audio encoder is configured to determine from a spectral tilt of a current frame of the audio signal a spectral tilt for a code of a codebook representing a current frame of the audio signal.

Another embodiment may have a method for synthesizing an audio signal, the method comprising: receiving an encoded audio signal, decoding the encoded audio signal using an adaptive codebook and a fixed codebook, the encoded audio signal being an encoded speech signal, applying a spectral tilt to a code of the fixed codebook for obtaining a filtered code of the fixed codebook, combining a code from the adaptive codebook and the filtered code of the fixed codebook to obtain a combined code, and filtering the combined code by a LPC synthesis filter for synthesizing the audio signal, wherein the spectral tilt is determined on the basis of the spectral tilt of the current frame of the audio signal, wherein the spectral tilt of the current frame of the audio signal is determined on the basis of spectral envelope information for the current frame of the audio signal, and wherein applying the spectral tilt comprises filtering the code of fixed the codebook based on a transfer function modeling the spectral tilt.

Another embodiment may have a non-transitory digital storage medium having a computer program stored thereon to perform, when said computer program is run by a computer, a method for synthesizing an audio signal, which method comprises: receiving an encoded audio signal, decoding the encoded audio signal using an adaptive codebook and a fixed codebook, the encoded audio signal being an encoded speech signal, applying a spectral tilt to a code of the fixed codebook for obtaining a filtered code of the fixed codebook, combining a code from the adaptive codebook and the filtered code of the fixed codebook to obtain a combined code, and filtering the combined code by a LPC synthesis filter for synthesizing the audio signal, wherein the spectral tilt is determined on the basis of the spectral tilt of the current frame of the audio signal, wherein the spectral tilt of the current frame of the audio signal is determined on the basis of spectral envelope information for the current frame of the audio signal, and wherein applying the spectral tilt comprises filtering the code of the fixed codebook based on a transfer function modeling the spectral tilt. The present invention provides an apparatus for synthesizing an audio signal which comprises a processing unit configured to apply a spectral tilt to the code of codebook used for synthesizing a current frame of the audio signal, wherein the spectral tilt is based on the spectral tilt of the current frame of the audio signal.

The present invention provides a method for synthesizing an audio signal, the method comprising applying a spectral tilt to the code of a codebook used for synthesizing a current frame of the audio signal, wherein the spectral tilt is determined on the basis of the spectral tilt of the current frame of the audio signal.

The inventors of the present application found out that the synthesizing of an audio signal can be further improved both at low and higher bit-rates by exploiting the nature of the spectral tilt of the audio signal upon synthesizing the signal for improving the achievable coding gain. In accordance with embodiments, the present invention provides for a speech coding, for example using the CELP speech coding technique, which allows enhancing the coding gain of CELP, thereby enhancing the perceptual quality of the decoded or synthesized signal. The inventive approach is based on the inventors' finding that this improvement can be achieved by adapting the spectral tilt of the codes of a codebook, for example the codes of the CELP innovative codebook, as a function of the spectral tilt of the actual input signal currently processed. The inventive approach is advantageous as, in addition to the enhanced coding gain, at low bit-rates, where the innovative codebook is not populated enough for modeling efficiently the fine structure of the speech, it also allows for a further formant enhancement. At higher bit-rates, where the innovative codebook is sufficiently populated, applying the inventive approach will enhance the coding gain. More specifically, at higher bit-rates the formant enhancement may not be needed, as the innovative codebook is large enough for modeling properly the fine structure of the speech, and further enhancing the formant will make the synthesized signal sound too synthetic. However, the optimal codes are not spectrally flat and adding a spectral tilt will enhance the coding gain. In accordance with embodiments the optimal tilt to apply to the codes of the innovative codebook is estimated more accurately, more specifically it is correlated to the tilt of the current frame of the input signal.

In accordance with embodiments the spectral tilt of the current frame of the audio signal is determined on the basis of spectral envelope information for the current frame of the audio signal, wherein the spectral envelope information may be defined by LPC coefficients. This embodiment is advantageous as it allows determining the spectral tilt of the current frame on the basis of information readily available both at the encoder and the decoder, namely the LPC coefficients.

In accordance with further embodiments the spectral tilt of the current frame of the audio signal, on the basis of the LPC coefficients, may be determined on the basis of a truncated infinite impulse response of the LPC synthesis filter. In accordance with embodiments, the truncation may be determined by the size of the innovative codebook, i.e. by the number of codes in the innovative codebook. This approach is advantageous as it allows to directly relate the determination of the spectral tilt to the actual size of the innovative codebook.

In accordance with further embodiments, the infinite impulse response may be of a LPC synthesis filter having a non-weighted transfer function or a weighted transfer function. Using the non-weighted transfer function allows for a simplified determination of the spectral tilt, while using the weighted transfer function is advantageous as it allows for a spectral tilt having a slope closer to the optimal tilt.

In accordance with embodiments, the determined spectral tilt is applied to the respective code by filtering the code from the codebook based on a transfer function which includes the spectral tilt. This embodiment is advantageous as by a simple filtering process the enhancement can be achieved.

In accordance with yet another embodiment the spectral tilt of the current frame may be combined with a factor related to the voicing of the previous frame of the audio signal, for example by filtering the code from the codebook based on a transfer function including the spectral tilt and the factor. This approach is advantageous as it provides for a possibility to obtain an even better estimate of the optimal tilt.

The present invention provides an audio decoder comprising the inventive apparatus for synthesizing an audio signal.

The present invention provides an audio decoder for decoding an audio signal, wherein the audio decoder is configured to apply a spectral tilt to the code of a codebook used for synthesizing a current frame of the audio signal, wherein the spectral tilt is based on the spectral tilt of the current frame of the audio signal.

The present invention provides an encoder for encoding an audio signal, wherein the audio encoder is configured to determine from a spectral tilt of a current frame of the audio signal a spectral tilt for a code of a codebook representing a current frame of the audio signal.

The present invention provides a system, comprising the inventive audio decoder and the inventive audio encoder.

The present invention provides a non-transitory computer medium storing instructions to carry out, when run on a computer, the inventive method for synthesizing an audio signal.

BRIEF DESCRIPTION OF THE DRAWINGS

Embodiments of the present invention will be detailed subsequently referring to the appended drawings, in which.

In the following, embodiments of the inventive approach will be described. It is noted that in the subsequent description similar elements/steps are referred by the same reference signs.

DETAILED DESCRIPTION OF THE INVENTION

Figure 1:
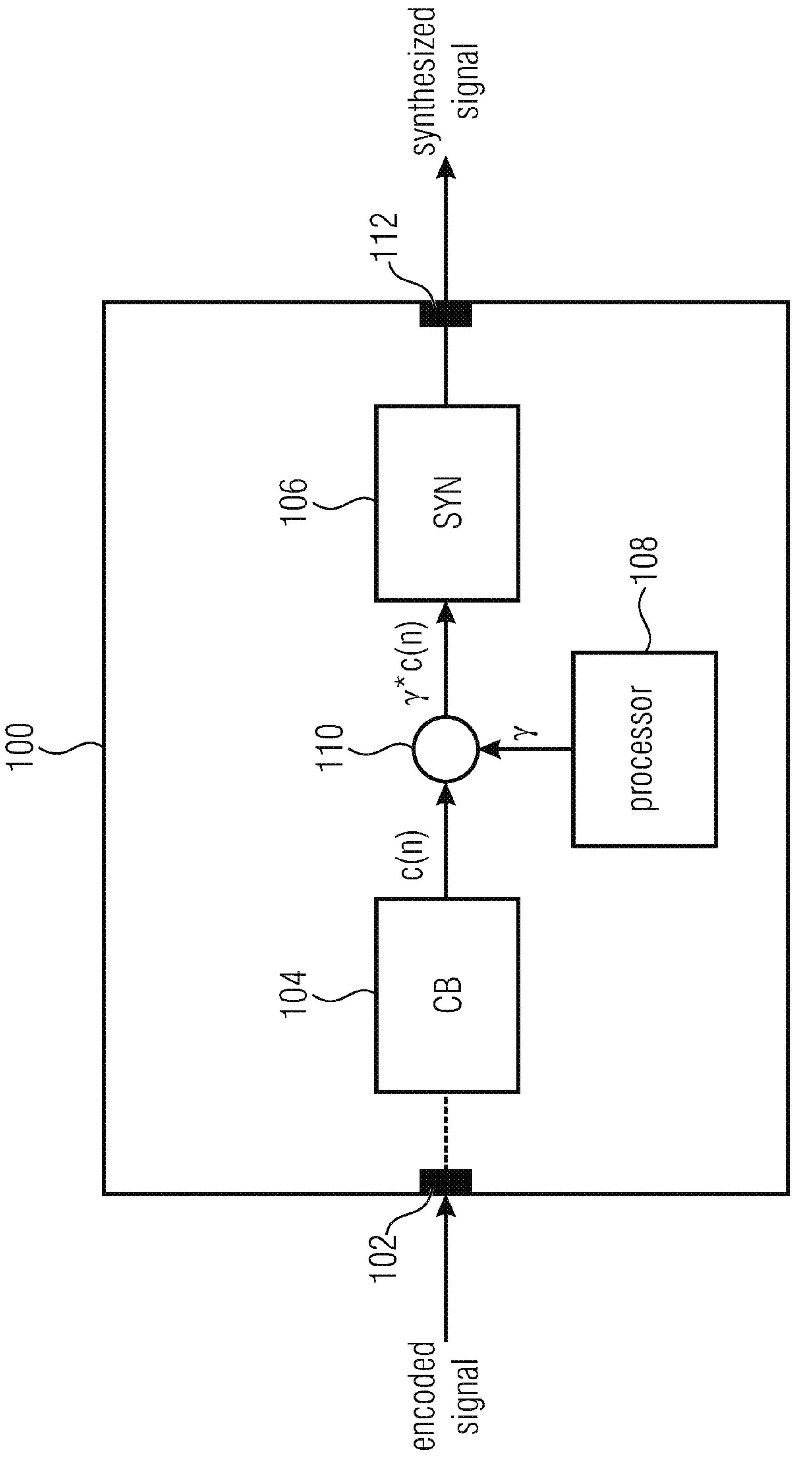
FIG. 1 shows a schematic representation of the inventive apparatus for synthesizing an audio signal in accordance with a first embodiment.

FIG. 1 shows a schematic representation of the inventive apparatus for synthesizing an audio signal in accordance with a first embodiment. The apparatus 100 receives at an input 102 an encoded signal, for example an encoded audio signal, like a speech signal. For decoding the audio signal, the apparatus 100 comprises a codebook 104 including a plurality of codes. For synthesizing the signal, when processing a current frame, on the basis of the encoded signal received at input 102, an appropriate code or codeword is selected from the codebook 104 and supplied towards the synthesizer or synthesis filter 106. In accordance with the present invention, the apparatus comprises the processing unit 108 which determines, based on the spectral tilt of the current frame of the audio signal, i.e. the frame of the audio signal currently processed by the apparatus 100, a spectral tilt to be applied to the code c(n) read from the codebook 104, as is schematically represented at 110. The modified code c(n)*γ is applied to the synthesis filter 106 which generates on the basis of the modified code a synthesized signal that is provided to the output 112 of the apparatus 100. The processing unit 108 may determine the spectral tilt on the basis of spectral envelope information for the current frame, e.g., filter coefficients for the synthesis filter 106 that are available at the apparatus 100.

Figure 2:
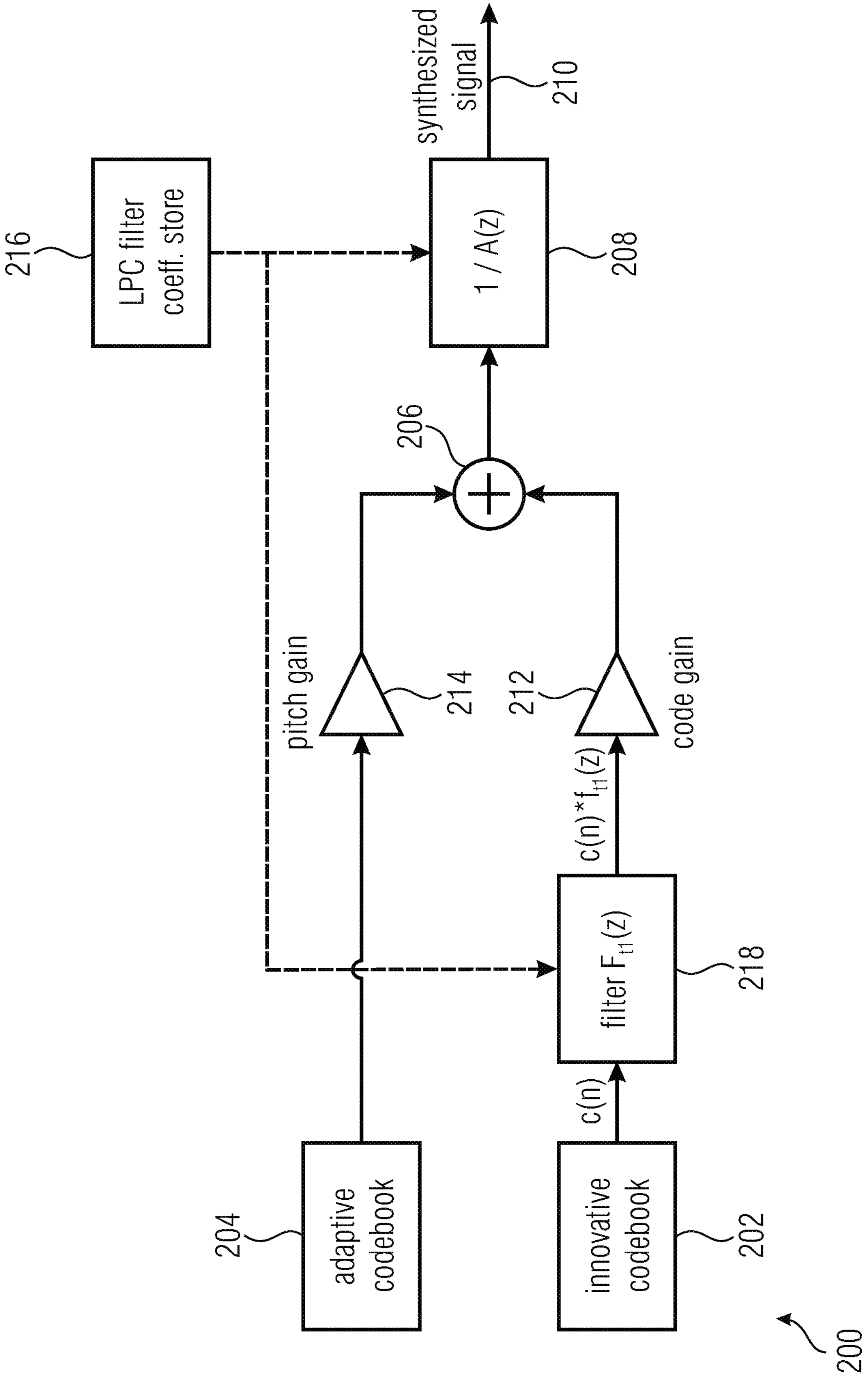
FIG. 2 shows a simplified block diagram of a signal synthesizer in accordance with a second embodiment of the invention, which operates on the basis of the CELP scheme.

In accordance with further embodiments, an adaptive tilt compensation for shaping codes of a CELP innovative codebook will be described. FIG. 2 shows a simplified block diagram of a signal synthesizer 200 in accordance with a second embodiment of the invention, which operates on the basis of the CELP scheme. In accordance with the CELP scheme, the synthesizer 200 includes a fixed or innovative codebook 202 and an adaptive codebook 204. Dependent on the encoded signal, for a current frame that is currently processed by the synthesizer 200, a code is output from the respective codebooks 202 and 204. The synthesizer 200 comprises a summer or combiner 206 for combining the codes received from the respective codebooks 202 and 204. The output of the summer 206 is connected to a LPC synthesis filter 208 for synthesizing the actual audio signal and outputting it at an output 210. In accordance with embodiments, the synthesizer 200 may include a first amplifier 212 for multiplying a contribution from the fixed codebook 202 by a desired code gain. Further, a second amplifier 214 may be provided for multiplying the contribution from the adaptive codebook 204 in accordance with a pitch gain as the contribution from the adaptive codebook models the pitch of the speech. In accordance with another embodiment also an LPC coefficient storage 216, like a memory or the like, may be provided for storing LPC coefficients that are available at the decoder including the synthesizer 200. The LPC coefficients are provided to the synthesis filter 208 for providing the desired LPC synthesis filtering.

The synthesizer 200 includes the filter 218 that is connected between the fixed codebook 202 and the first amplifier 212. The filter 218 receives from the storage 216 the LPC coefficients for the current frame. By means of the inventive structure the tilt of the audio frame that is currently processed is recovered from the already transmitted LPC coefficients that are stored in storage 216. In accordance with the embodiment of FIG. 2, it is assumed that $f_s(n)$ is the impulse response of the LPC synthesis filter 208 having the transfer function $F_s(z)=1/A(z)$, and the tilt is determined as follows by the filter 218:

$$\gamma = -\sum_{n=0}^{N} \frac{f_s(n+1) f_s(n)}{f_s^2(n)}$$

where N is the size of the truncation of the infinite impulse response $f_s(n)$. In accordance with an embodiment, N is equal to the size of the innovative codebook, i.e. N is equal to the number of codes or codewords stored in the innovative codebook. The spectral tilt is applied, in accordance with the embodiment of FIG. 2, to the code c(n) retrieved from the fixed codebook 202 by a filtering operation provided in the filter 218. The filtering operation is defined as follows:

$$c(n)*f_{t1}(n),$$

where $f_{t1}(n)$ is the impulse response of the following transfer function:

$$F_{t1}(z)=1-\gamma z^{-1}.$$

The embodiment of FIG. 2 is advantageous as it allows for enhancing the perceptual quality of the decoded signal by enhancing the coding gain. The enhancement of the coding gain is achieved by filtering a codeword or code retrieved from the fixed codebook 202 by a transfer function including a spectral tilt that is determined on the basis of the impulse response of the transfer function of the LPC synthesis filter 208.

In accordance with a third embodiment, for further improving the spectral tilt to be closer to an optimal tilt, i.e. to be closer to the actual tilt of the current frame of the input signal, the LPC synthesis filter 208 has the following transfer function:

$$F_e(z) = \frac{A(1/w1)}{A(1/w2)}$$

with w1=0.8 and w2=0.9. In this case, the spectral tilt is defined as follows:

$$\gamma = -\sum_{n=0}^{N} \frac{f_e(n+1) f_e(n)}{f_e^2(n)}$$

The weighting constants w1 and w2 are used to control the dynamic of the spectral envelope. For example, if w1=0 and w2=1, then $F_e(z)$ follows quite closely the true signal envelope. The resulting spectral tilt γ will show a high dynamic and can fluctuate too much. This may be a solution for very low bit-rates where the codebook lacks definitively of tilt structure. However it was found that perceptually it is better to deduce the spectral tilt γ from a smooth version of the spectral envelope. A good smoothing was found to be achieved with the above values w1=0.8 and w2=0.9, which shows a good trade-off for a large range of bit-rates. In accordance with embodiments, w1 and w2 are be bit-rate dependent. At very high rates if the codebook is large enough and is able to model any spectral tilts γ, one may switch off the influence of the spectral tilt γ by setting w1=w2=1.

When compared to the second embodiment, which yields a tilt having a steeper slope than the optimal tilt would have, the third embodiment using the "weighted" transfer function provides for a tilt that is closer to the actual tilt of the current frame.

Figure 3:
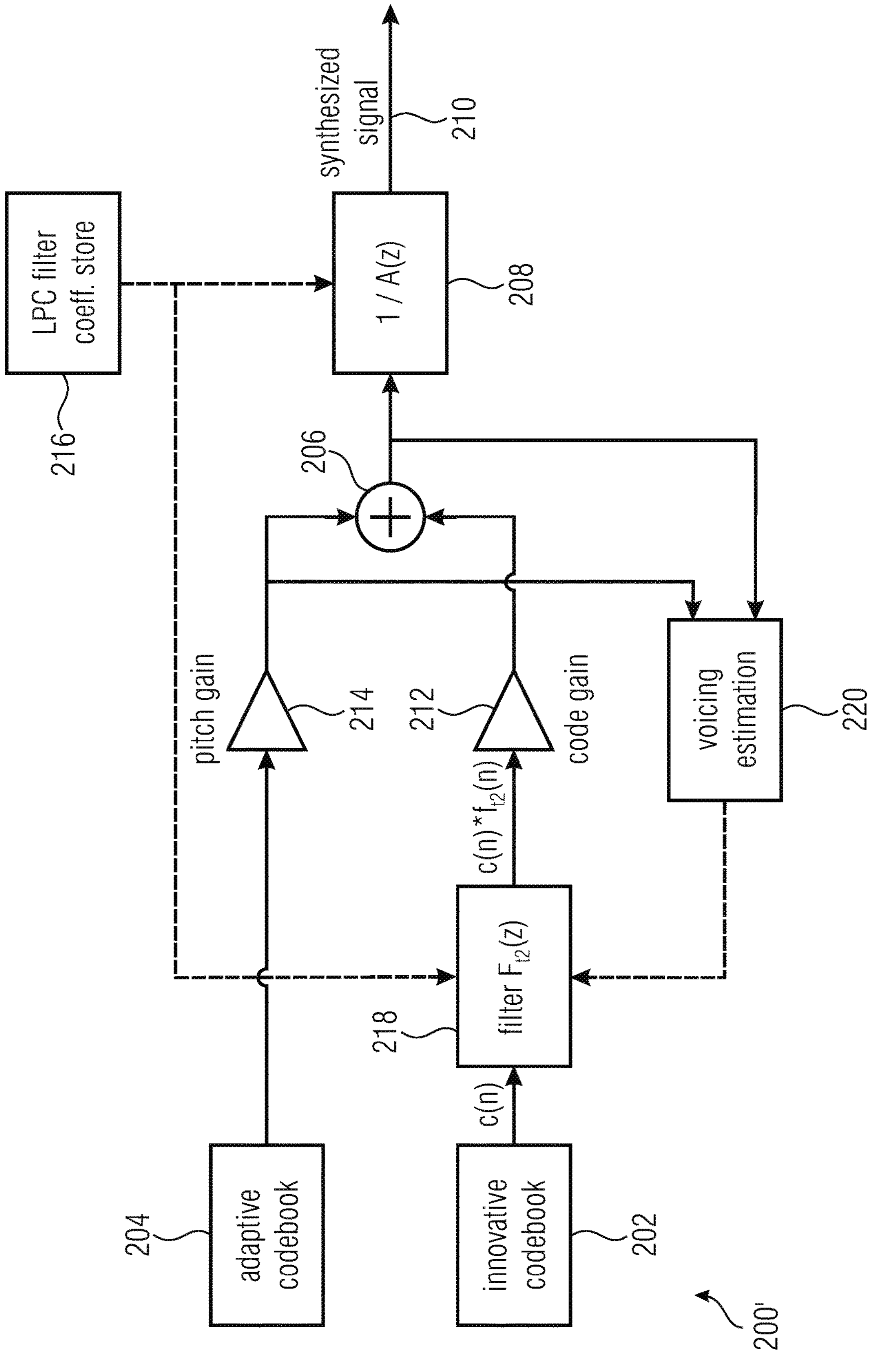
FIG. 3 shows a simplified block diagram of a signal synthesizer in accordance with a further embodiment of the present invention, again applying the CELP coding scheme incorporating the voicing of a previous frame.

FIG. 3 shows a further simplified block diagram of a signal synthesizer 200' in accordance with a fourth embodiment of the present invention, again applying the CELP coding scheme. When compared to the embodiments described with regard to FIG. 2, the embodiment described with regard to FIG. 3 further applies the above mentioned factor related to the voicing of a previous frame. As can be seen from FIG. 3, the structure of the synthesizer 200' is substantially the same as the structure of the synthesizer 200 of FIG. 2, except that in addition a voicing estimator 220 is provided that receives the output of the amplifier 214 and the combined contributions from the innovative and adaptive codebooks output by the summer 206. The voicing estimator outputs a signal to the filter 280 so that the code or codeword obtained from the innovative codebook 202 is modified on the basis of a determined tilt (see FIG. 2 and the description above) combined with a voicing factor. More specifically, in accordance with the embodiment of FIG. 3, the determined spectral tilt is combined with the factor β which relates to the voicing of the previous frame. The approach described with regard to FIG. 3 is advantageous as it allows to obtain an even better estimate of the tilt to be applied to the codeword when compared to the embodiments described with regard to FIGS. 1 and 2. The modification of the code or code shaping may again be considered as a filtering operation using a transfer function as follows:

$$F_{t2}(z)=1-(a\cdot\beta+b\cdot\gamma)z^{-1}$$

where a and b are constants. In an advantageous embodiment a=0.5 and b=0.25. The factor β may be deduced from the voicing of a previous frame as follows:

$$\text{voicing}=\frac{\text{energy(contribution of adaptive codebook)}-\text{energy(contribution of fixed codebook)}}{\text{energy(sum of contributions)}},$$

and the actual factor β may be determined as follows:

$$\beta=\text{constant}\cdot(1+\text{voicing})$$

The constants a and b are applied to control the mixture of voicing tilt β and the spectral tilt γ. As mentioned above with regard to the weighting constants w1 and w2, for low and medium bit-rates, it may be relevant to shape the codebook by sharpening low frequencies or high frequencies based on the spectral tilt γ. It was also observed that the more the signal is voiced the better is it to sharp the high frequencies. The constants a and b may be used to normalize the tilt factors β and γ and weigh their strengths in order to combine the two effects as desired. In accordance with embodiments, the constants a and b may be found empirically by assessing the perceptual quality. This gives about the same strength to both factors: γ is bounded between −1 and 1, so b·γ is between −0.25 and 0.25 and β is bounded between 0 and 0.5 so a·β is bounded between 0 and 0.25. As for the weighting constants w1 and w2, also the constants a and b may be made bit-rate dependent.

In accordance with the fourth embodiment, the audio synthesis as shown in FIG. 3 is such that the adaptive codebook contribution is multiplied by a gain called pitch gain as the contribution models the pitch of the speech. The innovative code is first filtered by $F_{t2}(z)$ for adding the spectral tilt to the code, wherein the tilt, as described above, is correlated to the tilt of the current frame of signal to be synthesized. The output of the filter 218 is multiplied by the code gain, and the two contributions, the multiplied contribution from the adaptive codebook and the multiplied modified contribution from the innovative codebook are summed by the summer 206 before being filtered by the synthesis filter for generating the synthesized output signal at the output 210.

Figure 4:
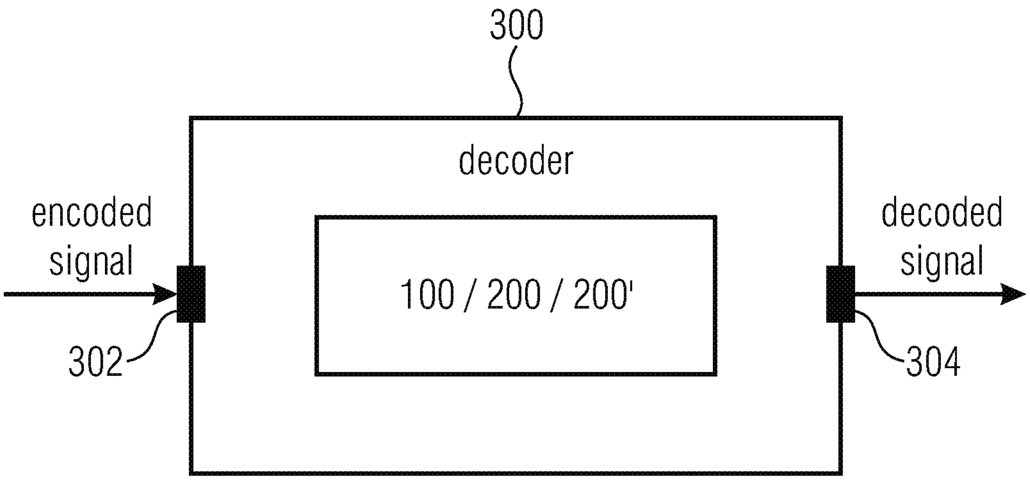
FIG. 4 shows an embodiment of a decoder, for example a speech decoder operating in accordance with the teachings of the present invention.

FIG. 4 shows an embodiment of a decoder, for example a speech decoder operating in accordance with the teachings of the present invention. The decoder 300 includes a synthesizer 100, 200, 200' in accordance with one of the above described embodiments. The decoder has an input 302 receiving an encoded signal that is processed by the decoder and the synthesizer for generating at an output 304 of the decoder 300 a decoded signal.

Figure 5:
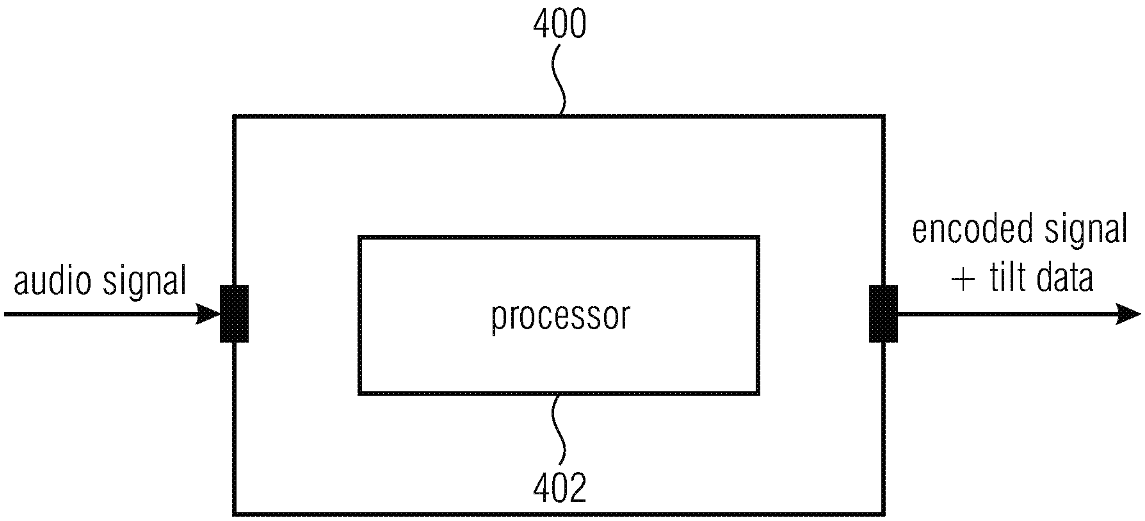
FIG. 5 shows an embodiment of an encoder, for example a speech encoder operating in accordance with the teachings of the present invention.

FIG. 5 shows an embodiment of an encoder, for example a speech encoder operating in accordance with the teachings of the present invention. The encoder 400 includes a processing unit 402 for encoding an audio signal. Further the processing unit determines from a spectral tilt of a current frame of the audio signal (e.g. from the LPC coefficients available at the encoder) information representing a spectral tilt for a code of a codebook at the decoder representing a current frame of the audio signal. This information may be transmitted together with the encodes audio signal to the decoder side where it can be applied upon synthesizing the audio signal. The spectral tilt may be determined at the encoder in a way as described above with regard to FIGS. 1 to 3, and it may be applied at the decoder as described above with regard to FIGS. 1 to 3. Thus, embodiments of the invention provide the above audio encoder as shown in FIG. 5 together with an audio decoder for decoding an audio signal, wherein the audio decoder does not necessarily need to determine the spectral tilt, rather, it is configured to apply the spectral tilt received from the encoder to the code of a codebook used for synthesizing a current frame of the audio signal. For example, the decoder may have a synthesizer as the one in FIGS. 1 to 3, except that the processing unit 108 or filter 218 receive the tilt calculated at and transmitted from the encoder. The received tilt may be stored, e.g., in the storage 216 or in another storage.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or programmed to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] Recommendation ITU-T G.718: "Frame error robust narrow-band and wideband embedded variable bit-rate coding of speech and audio from 8-32 kbit/s"

[2] U.S. Pat. No. 6,678,651 B2, "Short-Term Enhancement in CELP Speech Coding"

The invention claimed is:

1. An apparatus for synthesizing an audio signal, comprising:

an input for receiving an encoded audio signal, a decoder for decoding the encoded audio signal, the decoder comprising an adaptive codebook and a fixed codebook, and the encoded audio signal being an encoded speech signal, a filter coupled to the fixed codebook and configured to apply a spectral tilt to a code of the fixed codebook for obtaining a filtered code of the fixed codebook, a summer coupled to the adaptive codebook and to the filter, the summer configured to combine a code from the adaptive codebook and the filtered code of the fixed codebook for obtaining a combined code, and a LPC synthesis filter coupled to the summer and configured to synthesize the audio signal, wherein the spectral tilt is based on the spectral tilt of the current frame of the audio signal, wherein the apparatus is configured to determine the spectral tilt of the current frame of the audio signal on the basis of spectral envelope information for the current frame of the audio signal, and wherein the filter is configured to apply the spectral tilt by filtering the code of the fixed codebook based on a transfer function modeling the spectral tilt.

2. The apparatus of claim 1, wherein the spectral envelope information is defined by LPC coefficients, and wherein the spectral tilt of the current frame of the audio signal is defined as follows:

$$\gamma = -\sum_{n=0}^{N} \frac{f_s(n+1) f_s(n)}{f_s^2(n)}$$

with:

$f_e$(n) the infinite impulse response of a LPC synthesis filter comprising the transfer function $F_s$(Z)=1/A (z), and N the size of the truncation of the infinite impulse response $f_s$(n).

3. The apparatus of claim 1, wherein the spectral envelope information is defined by LPC coefficients, and wherein the spectral tilt of the current frame of the audio signal is defined as follows:

$$\gamma = -\sum_{n=0}^{N} \frac{f_e(n+1) f_e(n)}{f_e^2(n)}$$

with:

$f_s$(n) the infinite impulse response of a LPC synthesis filter comprising the transfer function $$F_e(z) = \frac{A(1/w1)}{A(1/w2)},$$

N the size of the truncation of the infinite impulse response $f_s$(n), and w1, w2 weighting constants for defining the formantic structure of the transfer function $F_e(z)$.

4. The apparatus of claim 3, wherein N is equal to the number of codes in the codebook.

5. The apparatus of claim 1, wherein the transfer function comprising the spectral tilt is defined as follows:

$$F_{t1}(z)=1-\gamma z^{-1}.$$

6. The apparatus of claim 1, wherein the apparatus is configured to combine the determined spectral tilt of the current frame of the audio signal with a factor related to the voicing of the previous frame of the audio signal.

7. The apparatus of claim 6, wherein the factor related to the voicing of the previous frame of the audio signal is defined as follows:

$$\beta = \text{constant}\cdot(1+\text{voicing}) \text{ with:}$$

$$\text{voicing} = \frac{\text{energy(contribution of adaptive codebook)} - \text{energy(contribution of fixed codebook)}}{\text{energy(sum of contributions)}}.$$

8. The apparatus of claim 6, wherein the filter is configured to apply the spectral tilt by filtering the code of the fixed codebook based on a transfer function comprising the spectral tilt and the factor related to the voicing of the previous frame of the audio signal.

9. The apparatus of claim 8, wherein the transfer function comprising the spectral tilt is defined as follows:

$$F_{t2}(z)=1-(\alpha\cdot\beta+b\cdot\gamma)z^{-1},$$

with:

a, b constants.

10. The apparatus of claim 1, further comprising:

a pitch gain amplifier coupled between the adaptive codebook and the summer, the pitch gain amplifier configured to multiply the code from the adaptive codebook with a pitch gain, and a code gain amplifier coupled between the filter and the summer, the code gain amplifier configured to multiply the filtered code of the fixed codebook with a code gain.

11. The apparatus of claim 10, further comprising:

a voicing estimator coupled to the adaptive codebook and to the summer, the voicing estimator configured to output a factor related to the voicing of the previous frame of the audio signal to the filter, and a storage configured to store LPC coefficients describing spectral envelope information for the current frame of the audio signal, the storage being coupled to the filter.

12. An audio decoder comprising apparatus for synthesizing an audio signal according to claim 1.

13. A system, comprising:

an audio decoder comprising apparatus for synthesizing an audio signal according to claim 1, and an audio encoder for encoding an audio signal, wherein the audio encoder is configured to determine from a spectral tilt of a current frame of the audio signal a spectral tilt for a code of a codebook representing a current frame of the audio signal.

14. A method for synthesizing an audio signal, the method comprising:

receiving an encoded audio signal, decoding the encoded audio signal using an adaptive codebook and a fixed codebook, the encoded audio signal being an encoded speech signal, applying a spectral tilt to a code of the fixed codebook for obtaining a filtered code of the fixed codebook, combining a code from the adaptive codebook and the filtered code of the fixed codebook to obtain a combined code, and filtering the combined code by a LPC synthesis filter for synthesizing the audio signal, wherein the spectral tilt is determined on the basis of the spectral tilt of the current frame of the audio signal, wherein the spectral tilt of the current frame of the audio signal is determined on the basis of spectral envelope information for the current frame of the audio signal, and wherein applying the spectral tilt comprises filtering the code of fixed the codebook based on a transfer function modeling the spectral tilt.

15. The method of claim 14, wherein the spectral envelope information is defined by LPC coefficients, and wherein the spectral tilt of the current frame of the audio signal is determined as follows:

$$\gamma = -\sum_{n=0}^{N} \frac{f_s(n+1)f_s(n)}{f_s^2(n)}$$

with:

$f_s$(n) the infinite impulse response of a LPC synthesis filter comprising the transfer function $F_s(z)=1/A(z)$, and N the size of the truncation of the infinite impulse response $f_s$(n).

16. The method of claim 14, wherein the spectral envelope information is defined by LPC coefficients, and wherein the spectral tilt of the current frame of the audio signal is determined as follows:

$$\gamma = -\sum_{n=0}^{N} \frac{f_e(n+1)f_e(n)}{f_e^2(n)}$$

with:

$f_s$(n) the infinite impulse response of a LPC synthesis filter comprising the transfer function $$F_e(z) = \frac{A(1/w1)}{A(1/w2)},$$

N the size of the truncation of the infinite impulse response $f_s$(n), and w1, w2 weighting constants for defining the formantic structure of the transfer function $F_e(z)$.

17. The method of claim 16, wherein N is equal to the number of codes in the codebook.

18. The method of claim 14, wherein the transfer function comprising the spectral tilt is determined as follows:

$$F_{t1}(z)-1-\neq z^{-1}.$$

19. The method of claim 14, further comprising combining the determined spectral tilt of the current frame of the audio signal with a factor related to the voicing of the previous frame of the audio signal.

20. The method of claim 19, wherein the factor related to the voicing of the previous frame of the audio signal is determined as follows:

$$\beta = \text{constant} \cdot (1 + \text{voicing}) \text{ with:}$$

$$\text{voicing} = \frac{\text{energy(contribution of adaptive codebook)} - \text{energy(contribution of fixed codebook)}}{\text{energy(sum of contributions)}}.$$

21. The method of claim 19, wherein applying the spectral tilt comprises filtering the code of the fixed codebook based on a transfer function comprising the spectral tilt and the factor related to the voicing of the previous frame of the audio signal.

22. The method of claim 21, wherein the transfer function comprising the spectral tilt is determined as follows:

$$F_{t2}(z)=1-(\alpha\cdot+b\cdot\gamma)z^{-1},$$

with:

a, b constants.

23. The method of claim 14, further comprising multiplying the code from the adaptive codebook with a pitch gain, and multiplying the filtered code of the fixed codebook with a code gain.

24. The method of claim 14, further comprising:

based on the code from the adaptive codebook and the combined code, generating a factor related to the voicing of the previous frame of the audio signal, and storing LPC coefficients describing spectral envelope information for the current frame of the audio signal.

25. A non-transitory digital storage medium having a computer program stored thereon to perform, when said computer program is run by a computer, a method for synthesizing an audio signal, which method comprises:

receiving an encoded audio signal, decoding the encoded audio signal using an adaptive codebook and a fixed codebook, the encoded audio signal being an encoded speech signal, applying a spectral tilt to a code of the fixed codebook for obtaining a filtered code of the fixed codebook, combining a code from the adaptive codebook and the filtered code of the fixed codebook to obtain a combined code, and filtering the combined code by a LPC synthesis filter for synthesizing the audio signal, wherein the spectral tilt is determined on the basis of the spectral tilt of the current frame of the audio signal, wherein the spectral tilt of the current frame of the audio signal is determined on the basis of spectral envelope information for the current frame of the audio signal, and wherein applying the spectral tilt comprises filtering the code of the fixed codebook based on a transfer function modeling the spectral tilt.

* * * * *